(12) United States Patent
Feng et al.

(10) Patent No.: US 12,443,893 B2
(45) Date of Patent: Oct. 14, 2025

(54) PARAMETER DATA SHARING FOR MULTI-LEARNER TRAINING OF MACHINE LEARNING APPLICATIONS

(71) Applicant: International Business Machines Corporation, Armonk, NY (US)

(72) Inventors: Minwei Feng, Hangzhou (CN); Yufei Ren, Somers, NY (US); Yandong Wang, Chicago, IL (US); Li Zhang, Yorktown Heights, NY (US); Wei Zhang, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 18/355,058

(22) Filed: Jul. 19, 2023

(65) Prior Publication Data

US 2024/0020582 A1 Jan. 18, 2024

Related U.S. Application Data

(63) Continuation of application No. 15/347,875, filed on Nov. 10, 2016, now Pat. No. 11,748,666.

(51) Int. Cl.
*G06N 20/20* (2019.01)
*G06N 20/00* (2019.01)
*H04L 67/10* (2022.01)

(52) U.S. Cl.
CPC ............. *G06N 20/20* (2019.01); *G06N 20/00* (2019.01); *H04L 67/10* (2013.01)

(58) Field of Classification Search
CPC .......... G06N 20/00; G06N 20/20; G06N 3/02; G06N 3/04; G06N 3/06; G06N 3/10; G06N 3/08; G06N 3/098
See application file for complete search history.

(56) References Cited

U.S. PATENT DOCUMENTS

2016/0174902 A1* 6/2016 Georgescu ........... G06V 10/454
600/408
2016/0203102 A1 7/2016 Meng
2018/0129969 A1 5/2018 Feng

OTHER PUBLICATIONS

Ooi et al., SINGA: A Distributed Deep Learning Platform, 2015 (Year: 2015).*

(Continued)

*Primary Examiner* — David Yi
*Assistant Examiner* — Charles C Kuo
(74) *Attorney, Agent, or Firm* — Elliot J. Shine

(57) ABSTRACT

A machine receives a first set of global parameters from a global parameter server. Multiple learner processors in the machine execute an algorithm that models an entity type using the first set of global parameters and a mini-batch of data known to describe the entity type. The machine generates a consolidated set of gradients that describes a direction for the first set of global parameters in order to improve an accuracy of the algorithm in modeling the entity type when using the first set of global parameters and the mini-batch of data. The machine transmits the consolidated set of gradients to the global parameter server. The machine then receives a second set of global parameters from the global parameter server, where the second set of global parameters is a modification of the first set of global parameters based on the consolidated set of gradients.

20 Claims, 7 Drawing Sheets

(56) References Cited

OTHER PUBLICATIONS

Parkhi et al., Cats and Dogs, 2012 (Year: 2012).*
Han et al., Deep Compression: Compressing Deep Neural Networks with Pruning, Trained Quantization and Huffman Coding, 2016 (Year: 2016).*
Forrest et al., Implementing Neural Network Models on Parallel Computers, 1987 (Year: 1987).*
Cotter et al., Better Mini-Batch Algorithms via Accelerated Gradient Methods, 2018 (Year: 2018).*
Anonymous, "Cunn/Dataparalleltable.lua", Github, Last Modified Feb. 21, 2017, <https://github.com/torch/cunn/blob/master/DataParallelTable.lua>, 17 pages.
Anonymous, "Information Cyber Risk Management; Welcome To MP Infotech", MPIT, downloaded from the Internet on Aug. 19, 2019, <https://mpinfotech.com>, 4 pages.
Anonymous, "Shared Memory", Wikipedia, page was last modified on Nov. 3, 2016, <https://web.archive.org/web/20161112212157/https://en.wikipedia.org/wiki/Shared_memory>, 4 pages.
Cotter et al., "Better Mini-Batch Algorithms via Accelerated Gradient Methods", Advances in Neural Information Processing Systems 24 (NIPS 2011), 9 pages.
Dean et al., "Large Scale Distributed Deep Networks", Advances in Neural Information Processing Systems, Dec. 25, 2012, <https://papers.nips.cc/paper/4687-large-scaled-distributed-deep-networks.pdf>, 9 pages.
Forrest et al., "Implementing Neural Network Models on Parallel Computers", The Computer Journal vol. 30, No. 5, Received Jun. 1987, pp. 413-419.
Han et al., "Deep Compression: Compressing Deep Neural Networks with Pruning, Trained Quantization and Huffman Coding", arXiv:1510.00149v5 [cs.CV], Feb. 15, 2016, 14 pages.
Hsu et al., "Enforcing Least Privilege Memory Views for Multithreaded Applications", CCS 2016, Oct. 24-28, 2016, Vienna, Austria, 13 pages.
IBM: List of IBM Patents or Patent Applications Treated as Related. Filed Herewith. 2 pages.
Mell et al., "The Nist Definition of Cloud Computing", National Institute of Standards and Technology, Information Technology Laboratory, Sep. 2011, 7 pages.
Ooi et al., "SINGA: a Distributed Deep Learning Platform", MM '15 Proceedings of the 23rd ACM International Conference on Multimedia, Oct. 26-30, 2015, Brisbane, Australia, pp. 685-688.
Parkhi et al., "Cats and Dogs", 2012 IEEE Conference on Computer Vision and Pattern Recognition, 2012, pp. 3498-3505.

* cited by examiner

PARAMETER DATA SHARING FOR MULTI-LEARNER TRAINING OF MACHINE LEARNING APPLICATIONS

BACKGROUND

The present invention relates to the field of computers, and particularly to computers that are capable of supporting machine learning. Still more particularly, the present invention relates to providing parameters needed in machine learning to learning machines.

SUMMARY

In one or more embodiments of the present invention, a computer-implemented method enables parameter data sharing. A machine receives a first set of global parameters from a global parameter server. The first set of global parameters includes data that weights one or more operands used in an algorithm that models an entity type. Multiple learner processors in the machine execute the algorithm using the first set of global parameters and a mini-batch of data known to describe the entity type. The machine generates a consolidated set of gradients that describes a direction for the first set of global parameters in order to improve the accuracy of the algorithm in modeling the entity type when using the first set of global parameters and the mini-batch of data known to describe the entity type. The machine transmits the consolidated set of gradients to the global parameter server. The machine then receives a second set of global parameters from the global parameter server, where the second set of global parameters is a modification of the first set of global parameters based on the consolidated set of gradients.

The described invention may also be implemented in a computer system and/or as a computer program product.

DETAILED DESCRIPTION

Figure 1:
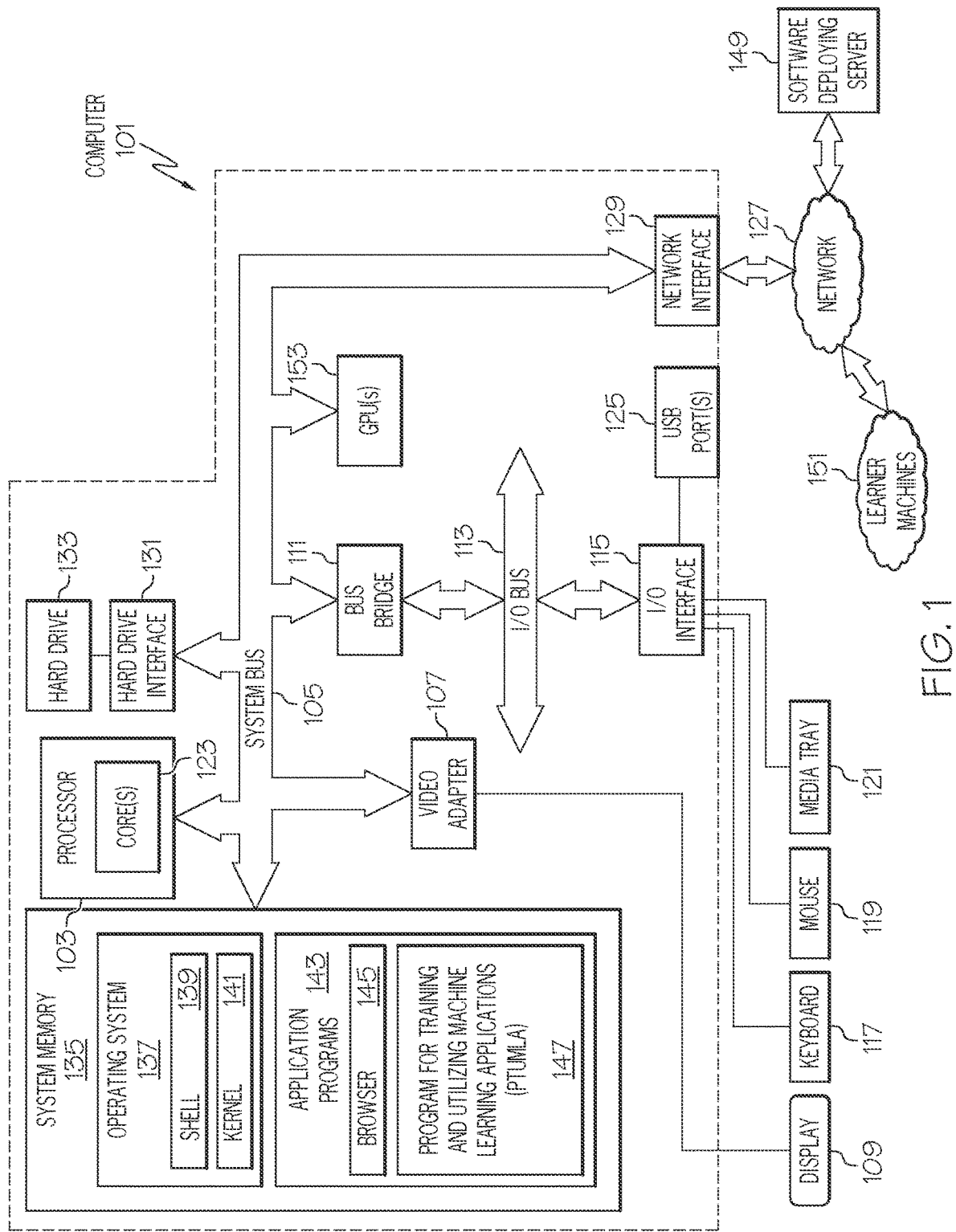
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or learner machines 151 shown in FIG. 1, and/or global parameter server 401 and/or machines 451-A and 451-B shown in FIG. 4, and/or global parameter server 501 and/or machines 551-A and 551-B shown in FIG. 5.

Exemplary computer 101 includes one or more processor(s) 103 that are coupled to a system bus 105. Processor(s) 103 may each utilize one or more core(s) 123, which contain execution units and other hardware beyond that found in the rest of the processor(s) 103 (e.g., on-board random access memory, etc.). A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems, such as systems that support the depicted learner machines 151, using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Training and Utilizing Machine Learning Applications (PTUMLA) 147. PTUMLA 147 includes code for implementing the processes described below, including those described in FIGS. 2-6. In one embodiment, computer 101 is able to download PTUMLA 147 from software deploying server 149, including in an on-demand basis, wherein the code in PTUMLA 147 is not downloaded until needed for execution. In one embodiment of the present invention, software deploying server 149 performs all of the functions associated with the present invention (including execution of PTUMLA 147), thus freeing computer 101 from having to use its own internal computing resources to execute PTUMLA 147.

Also within computer 101 in one or more embodiments are one or more graphics processing units depicted as GPU(s) 153. A graphics processing unit (GPU) is a processing device that is specifically architected to handle large strings of data, which are often associated with a graphics display. That is, a GPU is designed to handle strings of data that are used to control the appearance of pixels on a display. One or more embodiments of the present invention utilize GPU(s) 153 not only to analyze data associated with pixels in a display, but are also used to analyze any strings of data used to describe a particular type of entity, as described below.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
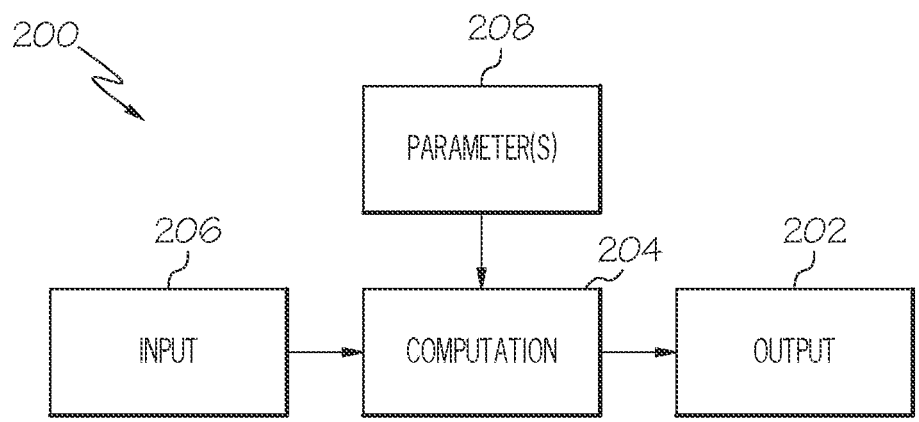
FIG. 2 illustrates a high level overview of machine learning as used in one or more embodiments of the present invention.

With reference now to FIG. 2, a high level overview of machine learning as used in one or more embodiments of the present invention is depicted as machine learning 200.

The goal of machine learning 200 is to generate a uniform output 202 from a computation 204 using input 206 and parameter(s) 208.

Computation 204 is an execution of a mathematical algorithm using the input 206 and the parameter(s) 208.

Input 206 is a set of data that describes a type of entity.

Parameter(s) 208 are weights for various components of input 206.

Output 202 is the result of executing the algorithm in computation 204.

For example, assume that the following algorithm is used in computation 204:

$$A+B=X$$

Assume now that A is data that describes an animal's whiskers, and that B is data that describes an animal's tail. If X=1, then the input 206 (A, B) is data that, when applied to the algorithm A+B, describes a cat. However, if X=2, then the input 206 (A, B) is data that, when applied to the algorithm A+B, describes a dog.

That is, assume that A describes how long the animal's whiskers are and B describes how long the animal's tail is. Thus, if (A+B) is (0.4+0.6), then X=1.0, and the values for A (0.4) and B (0.6) are indicative of a cat. However, if (A+B) is (0.8+1.2), then X=2.0, and the values for A (0.8) and B (1.2) are indicative of a dog.

In practical applications, however, the values for A and B are not uniform in value and/or importance. That is, the input 206 (A, B) may actually be 0.8 and 1.2 (instead of 0.4 and 0.6), and yet still be from a descriptor/measurement of the values associated with a particular cat's whiskers (0.8) and tail (1.2), even though X is now equal to 2 (0.8+1.2).

Furthermore, there are often hundreds, if not millions, of data units in input 206 used to describe a cat or a dog.

Therefore, parameters 208 are used to weight these data units.

Returning to the illustrative algorithm of A+B=X to determine whether the data describes a cat or a dog, assume now that the values of A and B come from a set of training files, known as a "mini-batch". That is, a first mini-batch is a set of data that is known to describe a particular type of entity, such as a cat. However, the values of A and B within the first mini-batch will differ.

For example, in a first set of data from the first mini-batch, assume that the respective values for A and B are 2 and 4 (i.e., A=2 and B=4). In a second set of data from the first mini-batch, assume that the respective values for A and B are 3 and 5 (i.e., A=3 and B=5). In a third set of data from the first mini-batch, assume that the respective values for A and B are 1 and 5 (i.e., A=1 and B=5). Using these values unweighted (i.e., without parameters/parameter data/parameter values) would result in the formula A+B=X giving the results of.

2+4=6 (for the first set of data from the first mini-batch)

3+5=8 (for the second set of data from the first mini-batch)

1+5=6 (for the third set of data from the first mini-batch)

Without any parameter weights, none of these data will result in a value of 1.0 for X (indicative of a cat). Therefore, an initial set of parameters (also referred to herein as weights, parameter weights, parameter data, parameter values, etc.) is applied to the data, in order to force X to be close to the value of 1.

In an embodiment of the present invention, a same parameter value is applied to each of the input data. For example, assume that the parameter/parameter value is 0.2 and is to be multiplied against each of the data values. In the example shown above, this would result in:

2*0.2+4*0.2=0.4+0.8=1.2 (for the first set of data from the first mini-batch)

3*0.2+5*0.2=0.6+1.0=1.6 (for the second set of data from the first mini-batch)

1*0.2+5*0.2=0.2+1.0=1.2 (for the third set of data from the first mini-batch)

This brings the average value of X near 1.0, thus indicating that the data describes a cat.

In an embodiment of the present invention, assume that a second mini-batch is of data known to describe a dog. The algorithm used to identify a dog may be a different algorithm than A+B=X (used to identify a cat). However, for purposed of illustration, assume that the same algorithm (A+B=X) and parameter (0.2) is used with "dog" data in the second mini-batch.

For example, in a first set of data from the second mini-batch, assume that the respective values for A and B are 4 and 8 (i.e., A=4 and B=8). In a second set of data from the second mini-batch, assume that the respective values for A and B are 6 and 10 (i.e., A=6 and B=10). In a third set of data from the second mini-batch, assume that the respective values for A and B are 1 and 5 (i.e., A=1 and B=5).

Assume now that the same parameter/parameter value of 0.2 is multiplied against each of the data values. In the "dog" example, this would result in:

4*0.2+8*0.2=0.8+1.6=2.4 (for the first set of data from the second mini-batch)

6*0.2+10*0.2=1.2+2.0=3.2 (for the second set of data from the second mini-batch)

2*0.2+10*0.2=0.4+2.0=2.4 (for the third set of data from the second mini-batch)

This brings that average value of X near 2.0, thus indicating that the data describes a dog.

In one or more embodiments of the present invention, however, different parameters are applied to each of the data values in the sets of data. For example, consider again the algorithm of A+B=X presented above, and assume that the data is the same known data that describes a cat as presented above. However, instead of applying the same parameter to each datum within the data set, a different parameter is applied to each datum. For example, assume that the parameter 0.3 is multiplied against A and the parameter 0.1 is applied against B.

Using the values for A and B in the example shown above for known "cat" data, this would result in:

2*0.3+4*0.1=0.6+0.4=1.0 (for the first set of data from the first mini-batch)

3*0.3+5*0.1=0.9+0.5=1.4 (for the second set of data from the first mini-batch)

1*0.3+5*0.1=0.3+0.5=0.8 (for the third set of data from the first mini-batch)

This brings that gradient of values for X closer 1.0, thus providing a more accurate indication that the data describes a cat.

Figure 3:
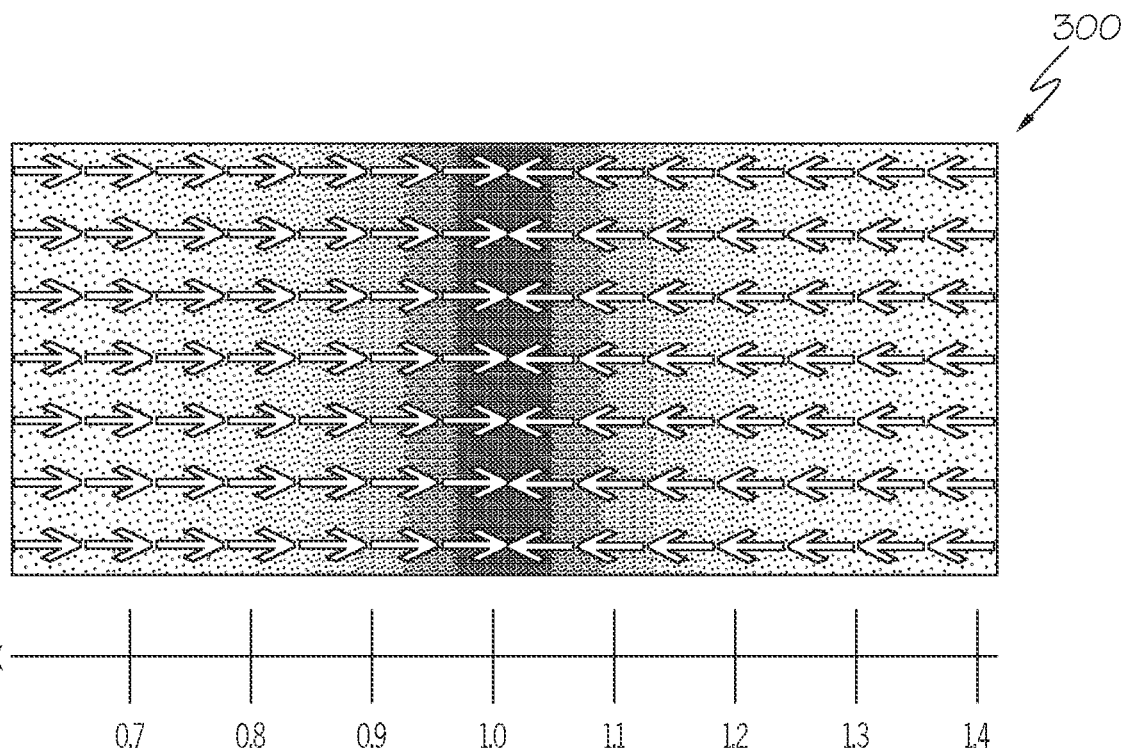
FIG. 3 illustrates a gradient graph as used in one or more embodiments of the present invention.

With reference now to FIG. 3, a gradient graph 300 illustrates the concept of a gradient, and particularly the gradient of the value of X in the algorithm A+B=X. As shown in gradient graph 300, assume that multiple mini-batches have been run using a particular set of parameters (e.g., a global parameter of 0.2 or discrete parameters of 0.3 and 0.1 as described above). As shown in gradient graph 300, there is a heavy concentration of values for X at 1.0, indicating that the parameter(s) used when executing the algorithm A+B (and using the data from the mini-batch as inputs) were a good choice, even though there are still outlier results at 0.7 and 1.4.

Figure 4:
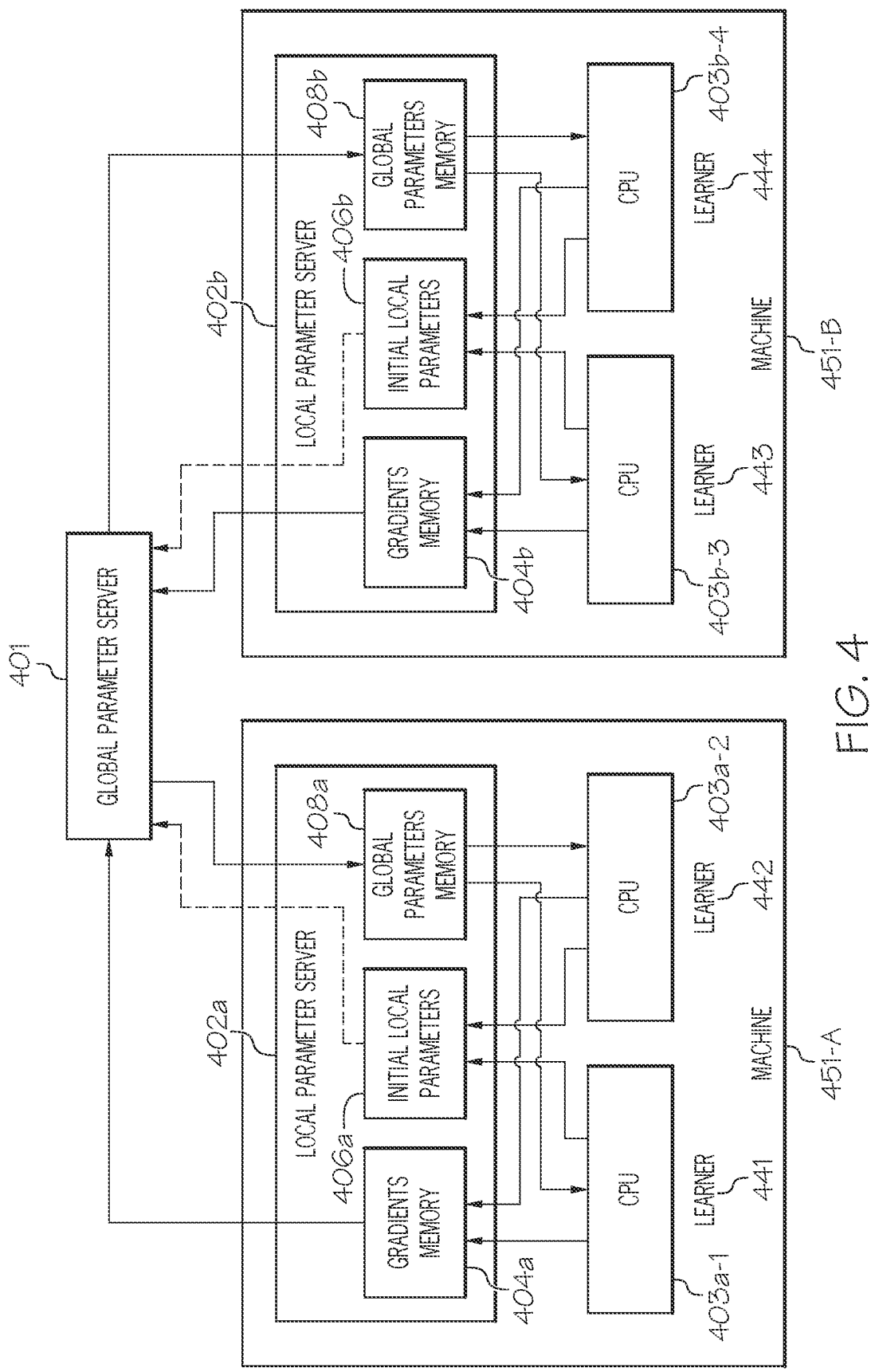
FIG. 4 depicts an overview of one or more embodiments of the present invention that utilize central processing units (CPUs)

With reference now to FIG. 4, an overview of one or more embodiments of the present invention that utilize central processing units (CPUs) is presented.

As depicted in FIG. 4, a global parameter server 401 (analogous in architecture to computer 101 shown in FIG. 1) supplies global parameters used by machine 451-A and machine 451-B (which are analogous to the learner machines 151 shown in FIG. 1).

Assume that CPU 403a-1 and CPU 403a-2 initially were trained using local parameters. As suggested by their identifiers, CPU 403a-1 is part of learner 441 in machine 451-A, and CPU 403a-2 is part of learner 442 in machine 451-A.

Assume that CPU 403a-1 was fed data from a mini-batch of data known to describe a cat and CPU 403a-2 was fed data from the same or a different mini-batch of data known to describe a cat. CPU 403a-1 and CPU 403a-2 will initially use initial local parameters 406a (e.g., parameters that are stochastically generated (randomly selected) for use by CPU 403a-1 and CPU 403a-2). For example, CPU 403a-1 and CPU 403a-2 may both use the parameters "0.3" and "0.1" to be multiplied against the respective values of A and B in the algorithm A+B=X described above. These values for the initial local parameters 406a may be generated by one or both of the CPU 403a-1 and CPU 403a-2, or by another processor (not shown).

Gradients memory 404a describes how to improve "X" to 1.0 when the initial local parameters 406a were used when evaluating mini-batch data that was known to describe a cat. As shown in FIG. 4, these initial local parameters 406a may be sent to global parameter server 401. That is, the gradients (such as those depicted in FIG. 3) for "X" that resulted from using "0.3" and "0.1" as the initial local parameters 406a are sent to global parameter server 401.

Thus, the initial local parameters 406a are sent to global parameter server 401 as a "starting point" set of parameters, which will be modified by the global parameter server 401 based on the gradients 404a that resulted from the use of these initial local parameters 406a by CPU 403a-1 and CPU 403a-2.

Similarly, initial local parameter 406b and gradients memory 404b generated by CPU 403b-3 in learner 443 and CPU 403b-4 in learner 444 in machine 451-B are sent to global parameter server 401.

The global parameter server 401 will thus 1) consolidate (e.g., average) the initial local parameters 406a and initial local parameters 406b, and 2) modify them according to the gradients 404a and gradients 404b that resulted in respective machine 451-A and machine 451-B, in order to create a global parameter. As shown in FIG. 4, a copy of the same global parameter is stored in a global parameters memory 408a and global parameters memory 408b in respective machines 451-A and 451-B.

Global parameters memory 408a is a shared memory from which CPU 403a-1 and CPU 403a-2 are both able to read the global parameters received from global parameter server 401. Likewise, global parameters memory 408b is a shared memory from which CPU 403b-3 and CPU 403b-4 are both able to read the global parameters received from global parameter server 401. Thus, the bandwidth consumption between global parameter server 401 and machine 451-A and between global parameter server 401 and machine 451-B is greatly reduced, since CPU 403a-1 and CPU 403a-2 are able to share the same parameters found in global parameters memory 408a (and since CPU 403b-3 and CPU 403b-4 are able to share the same parameters found in global parameters memory 408b).

After using the global parameter(s) from global parameter server 401 when applying an algorithm (e.g., A+B=X) to data from a mini-batch, CPU 403a-1 and CPU 403a-2 send their respective gradients (of the resulting values "X") to gradients memory 404a. These gradients may be consolidated (e.g., averaged) by machine 451-A in order to further reduce bandwidth consumption between global parameter server 401 and machine 451-A, or (alternatively) each of the gradients may sent from machine 451-A to global parameter server 401. Similarly, gradients resulting from the use of global parameter(s) by machine 451-B will be sent to global parameter server 401.

The process reiterates such that each time the learners 441, 442, 443, and/or 444 use a new global parameter against a same or different set of learning data (e.g., mini-batches of data that describes a known type of entity such as a cat), new gradients are generated and sent to the global parameter server 401, which then further tweaks (i.e., predicts a next iteration of) the global parameter.

As shown in FIG. 4, the gradients memory 404*a* and global parameters memory 408*a* are shared memory that is shared between CPU 403*a*-1 and CPU 403*a*-2 (just as gradients memory 404*b* and global parameters memory 408*b* are shared memory that is shared among CPU 403*b*-3 and CPU 403*b*-4). Thus, gradients memory 404*a* and global parameters memory 408*a* perform the function of a local parameter server 402*a* (just as gradients memory 404*b* and global parameters memory 408*b* perform the function of a local parameter server 402*b*). That is, rather than CPU 403*a*-1 and CPU 403*a*-2 having to pull duplicate copies of the updated parameters from the global parameter server 401 (and thus consuming a large amount of bandwidth in the network between the global parameter server 401 and the machine 451-A), a single copy of the updated parameters is sent to the global parameters memory 408*a* within the machine 451-A, which is then stored in the shared memory (that is, global parameters memory 408*a*) for use by CPU 403*a*-1 and CPU 403*a*-2. Similarly, a single copy of the updated parameters is sent to the global parameters memory 408*b* within the machine 451-B, which is then stored in the shared memory (that is, global parameters memory 408*b*) for use by CPU 403*b*-3 and CPU 403*b*-4.

Figure 5:
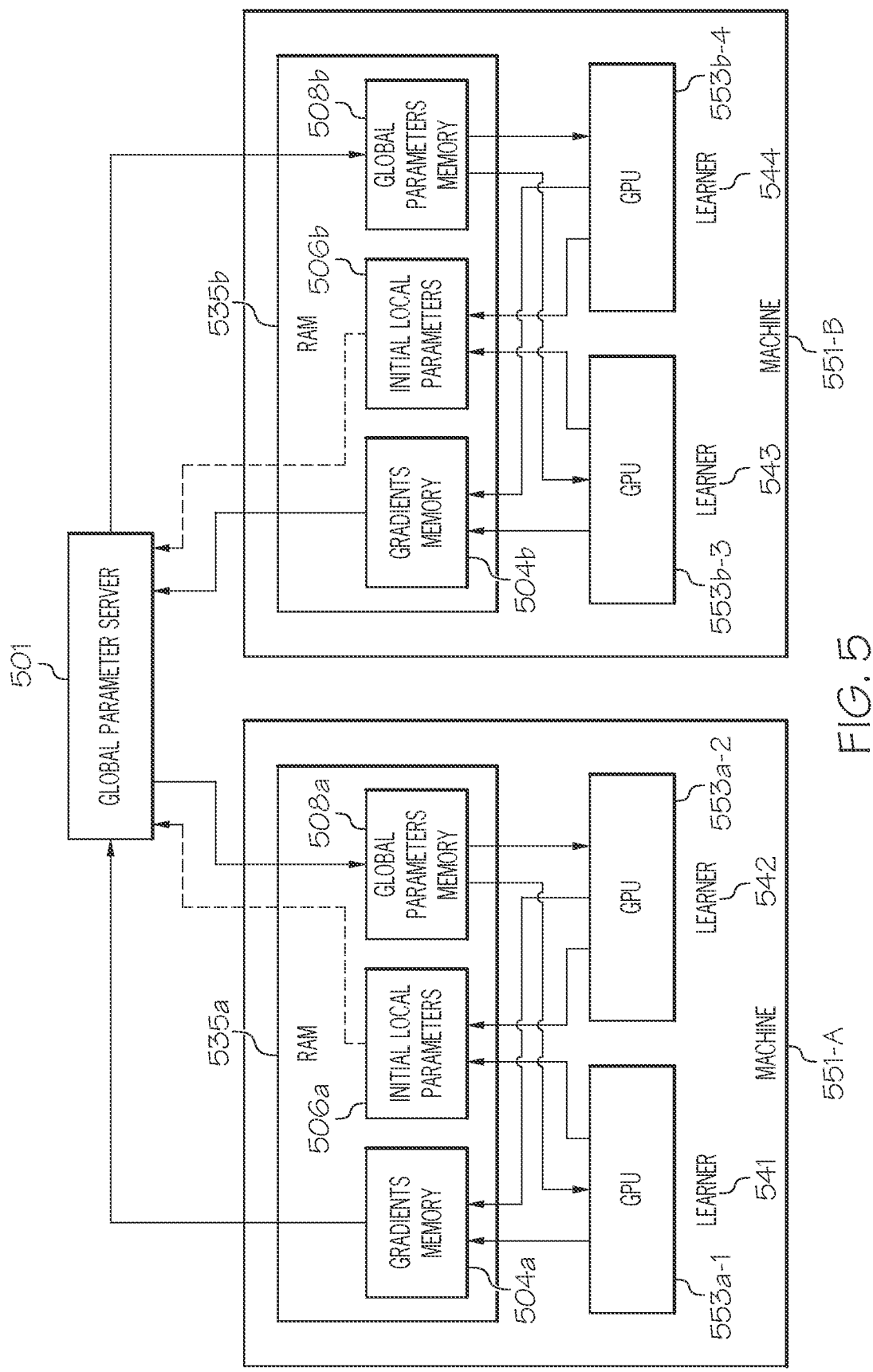
FIG. 5 depicts an overview of one or more embodiments of the present invention that utilize graphics processing units (GPUs)

While FIG. 4 has shown the present invention implemented in a CPU-based set of machines 451-A and 451-B, in another embodiment the present invention is implemented in a graphics processing unit (GPU) based system, as depicted in FIG. 5.

As depicted in FIG. 5, a global parameter server 501 (analogous to global parameter server 401 shown in FIG. 4) supplies global parameters used by machine 551-A and machine 551-B (which are analogous to the learner machines 151 shown in FIG. 1).

However, rather than utilizing CPUs, machines 551-A and 551-B utilize graphic processing units (GPUs) 553*a*-1, 553*a*-2, 553*b*-3, and 553*b*-4. These GPUs are specialized processors that were originally designed to control a display. More specifically, GPUs are designed to handle arrays of pixel data, which then controls a display. For example, a graphics array may contain data describing the hue, intensity, etc. of each pixel in a display. As suggested by their identifiers, GPU 553*a*-1 is part of learner 541 in machine 551-A, GPU 553*a*-2 is part of learner 542 in machine 551-A, GPU 553*b*-3 is part of learner 543 in machine 551-B, and GPU 553*b*-4 is part of learner 544 in machine 551-B (analogous, respectively, to learners 441, 442, 443, and 444 in FIG. 4).

As shown in FIG. 5, the gradients memories 504*a*-504*b*, initial local parameters 506*a*-506*b*, and global parameters memories 508*a*-508*b* are stored in random access memory (RAM) 535*a*-535*b* in the respective machines 551-A and 551-B.

Thus, RAM 535*a* and RAM 535*b* provide shared memories from which global parameters are made available to GPUs 553*a*-1, 553*a*-2, 553*b*-3, and 553*b*-4 when testing the mini-batches against the algorithms described above. The system shown in FIG. 5 provides the advantage of saving bandwidth between global parameter server 501 and machines 551-A and 551-B and increased efficiency from using local memories to retrieve the parameters (as in FIG. 4), plus provides the performance improvement over the system shown in FIG. 4 by using GPUs whose performance may be better suited than CPUs for the presently described operations (due to their ability to handle large quantities of vector data as found in the mini-batches).

In one or more embodiments of the present invention, a single thread/process is set up to download parameters from the global parameter server 401/501 to the machines shown in FIGS. 4-5. If the network connecting global parameter server 401/501 to the machines shown in FIGS. 4-5 is the Internet or a similar IP-based network, then a transfer control protocol (TCP) is used to connect the systems. However, if a direct connection is established between the systems (e.g., an Ethernet), then a remote direct memory access (RDMA) protocol can be used to directly "inject" the parameters into the global parameters memories shown in FIGS. 5-6.

Various processes can be used to consolidate parameters and/or gradients, either at the global parameter server 401/501, or within the machines shown in FIGS. 4-5. For example, when the original parameter is derived from the initial local parameters 406*a*-406*b* (and/or 506*a*-506*b*) by the global parameter server 401/501, or when the resulting global parameters are updated, these parameters can be mathematically averaged, or they may be developed using the gradients from the gradient memories described herein. That is, the global parameter server 401/501 can create the updated global parameter using the gradients and a downpour stochastic gradient descent (SGD) algorithm, an elastic averaging stochastic gradient descent (EASGD) algorithm, etc. that will provide direction for speculating on how the global parameter should be changed/updated.

Figure 6:
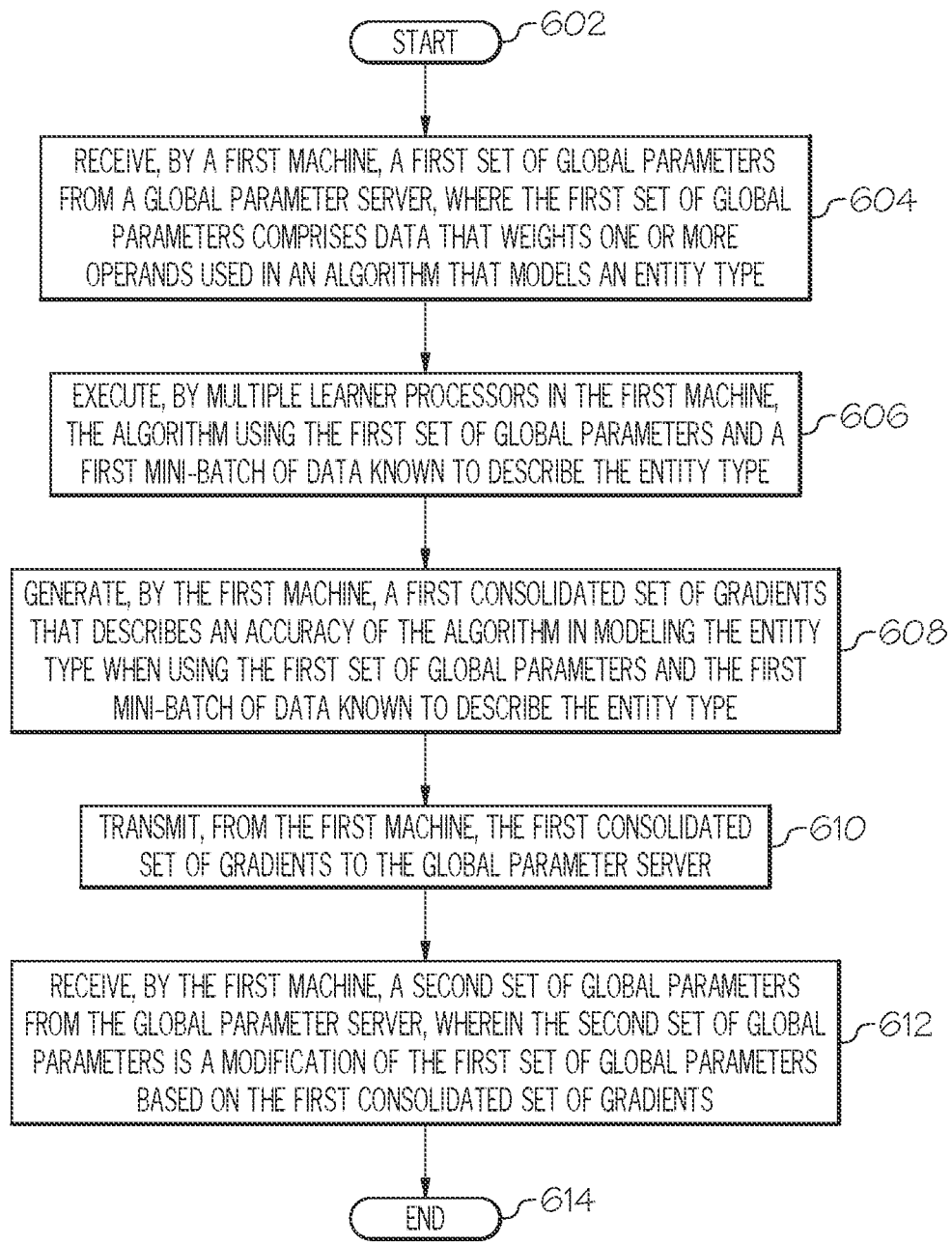
FIG. 6 is a high-level flow chart illustrating a process in accordance with one or more embodiments of the present invention.

With reference now to FIG. 6, a high-level flow chart illustrating a process in accordance with one or more embodiments of the present invention is presented.

After initiator block 602, a first machine (e.g., machine 451-A shown in FIG. 4) receives a first set of global parameters from a global parameter server (e.g., global parameter server 401), as described in block 604. As described herein, the first set of global parameters includes data that weights one or more operands used in an algorithm that models an entity type. That is, the global parameter may be 0.3 and 0.1 for the operands A and B in the algorithm A+B=C that models a cat (entity type).

As described in block 606, multiple learner processors (e.g., CPU 403*a*-1 and CPU 403*a*-2) in the first machine execute the algorithm using the first set of global parameters and a first mini-batch of data known to describe the entity type (e.g., a batch of vectors that are known to describe a cat).

As described in block 608, the first machine generates a first consolidated set of gradients (stored in gradients memory 404*a* either as a group or as a consolidated (e.g., averaged) group). The first consolidated set of gradients describes an accuracy of the algorithm in modeling the entity type when using the first set of global parameters and the first mini-batch of data known to describe the entity type (see FIG. 3).

As described in block 610, the first machine transmits the first consolidated set of gradients to the global parameter server.

As described in block 612, the first machine then receives a second set of global parameters from the global parameter server, where the second set of global parameters is a modification of the first set of global parameters based on the first consolidated set of gradients.

The flow chart ends at terminator block 614.

In an embodiment of the present invention, a second machine (e.g., machine 451-B) also receives the first set of global parameters from the global parameter server, executes the algorithm using the first set of global parameters and a second mini-batch of data known to describe the entity type, in order to generate a second consolidated set of gradients that describe the accuracy of the algorithm in modeling the entity type when using the first set of global parameters. The second machine then transmits the second consolidated set of gradients to the global parameter server, which creates a third set of global parameters, which are received by and used by the first machine and the second machine. This third set of global parameters is a modification of the first set of global parameters based on the first consolidated set of gradients and the second consolidated set of gradients.

Once the global parameters are established in final form (e.g., the third set of global parameters), they can then be used against unknown sets of data to identify the subject of the data. That is, a third machine (which may or may not be one of the machines 451-A or 451-B that were used to develop the final parameters) tests a set of unknown data using the third set of global parameters in order to determine whether the set of unknown data matches the entity type. That is, by using the optimized parameters with the algorithm described herein, the system is able to tell what type of entity (e.g., cat or dog) is represented/modeled by the data. This data may be purely descriptive (i.e., text-based descriptors) or graphic-based.

For example, the data may be a vector of image data of an animal. By inputting this vector of image data (still or moving) into the algorithm (using the final parameters), the intelligent system is now able to identity that animal as being a cat or a dog.

In an embodiment of the present invention and as described herein, a different learner processor (e.g., CPU 403*a*-1 and CPU 403*a*-2) in the first machine will generate each of the first consolidated set of gradients. That is, CPU 403*a*-1 will generate a first gradient and CPU 403*a*-2 will generate a second gradient. Each of the multiple learner processors will then write their respective gradient to memory in the first machine (e.g., to gradients memory 404*a*). The first machine will then consolidate the different gradients (e.g., average them) in order to create the first consolidated set of gradients. Otherwise, the consolidated set of gradients is simply a collection of all of the gradients (as used in another embodiment of the present invention).

In an embodiment of the present invention, all of the multiple learner processors in the first machine read the first set of global parameters and the second set of global parameters from a shared memory in the first machine (e.g., from global parameters memory 408*a*).

In an embodiment of the present invention, one or more processors (e.g., CPU 403*a*-1) store global parameters currently in use by the first machine in a first memory in the first machine, and store global parameters being downloaded from the global parameter server for future use in a second memory in the first machine. For example, assume that global parameters memory 408*a* is partitioned into two parts, wherein the first partition is used to store global parameters that are currently being used and the second partition is used to store global parameters that will be used in a next iteration. That is, the global parameter server 401 can speculatively generate the next iteration of global parameters, such that the machine 451-A can immediately start working on a next (or the same) mini-batch after it has finished testing/using the current mini-batch using the current global parameter.

In order to determine if use of a global parameter is concluded, a use version number or other indicator lets the learners (e.g., learners 441 and 442) know that use of the current global parameter is completed. Version numbers can be used to characterize the staleness of parameters and can apply staleness-aware gradient update rule.

In an embodiment of the present invention, the system can use multiple memory buffers for continuous downloading of parameters from the remote parameter server (e.g., global parameter server 401). Counters can be used to keep track of remaining users of local parameters and determine when the local parameter buffer can be reused.

In an embodiment of the present invention, global parameters further weight results from one or more particular operators used in the algorithm that models the entity type.

For example, assume that the algorithm used to model the type of entity is:

$$A+(B*C)=X$$

As before, if X=1, then the data (A, B, C) describes a cat, while if X=2, then the data describes a dog. However, the system may learn that the values that are multiplied (B and C) are inconsequential. As such, the results of any operation that uses operator*is discounted (e.g., weighted such that it approaches zero). As a result, only the weighted/parameterized value A is used to generate X.

As described herein in one or more embodiments, the present invention sets up local shared memory to hold local gradients (e.g., in gradients memory 404*a*) and parameters (e.g., in global parameters memory 408*a*). This provides local communication among the processors (e.g., CPUs 403*a*-1 and 403*a*-2), allowing them to exchange gradients/parameters within a local parameter server (e.g., local parameter server 402*a*) through this shared memory.

In an embodiment, the system uses an Inter-Process Communication (IPC) via the shared memory, which is mapped to each process's virtual memory address space. That is, each parameter and/or gradient is mapped to a virtual memory address space for storage, which provides fault-isolation and fault-tolerance compared to traditional thread-based implementations. This also offers the best possible IPC runtime speed, which is comparable to a thread-based solution.

In an embodiment of the present invention, the system sets up a local aggregation thread/process to aggregate gradients or local weights from local learners, rather than sending individual gradients/weights to the global parameter server 401/501, thus further reducing bandwidth consumption to the global parameter server 401/501.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
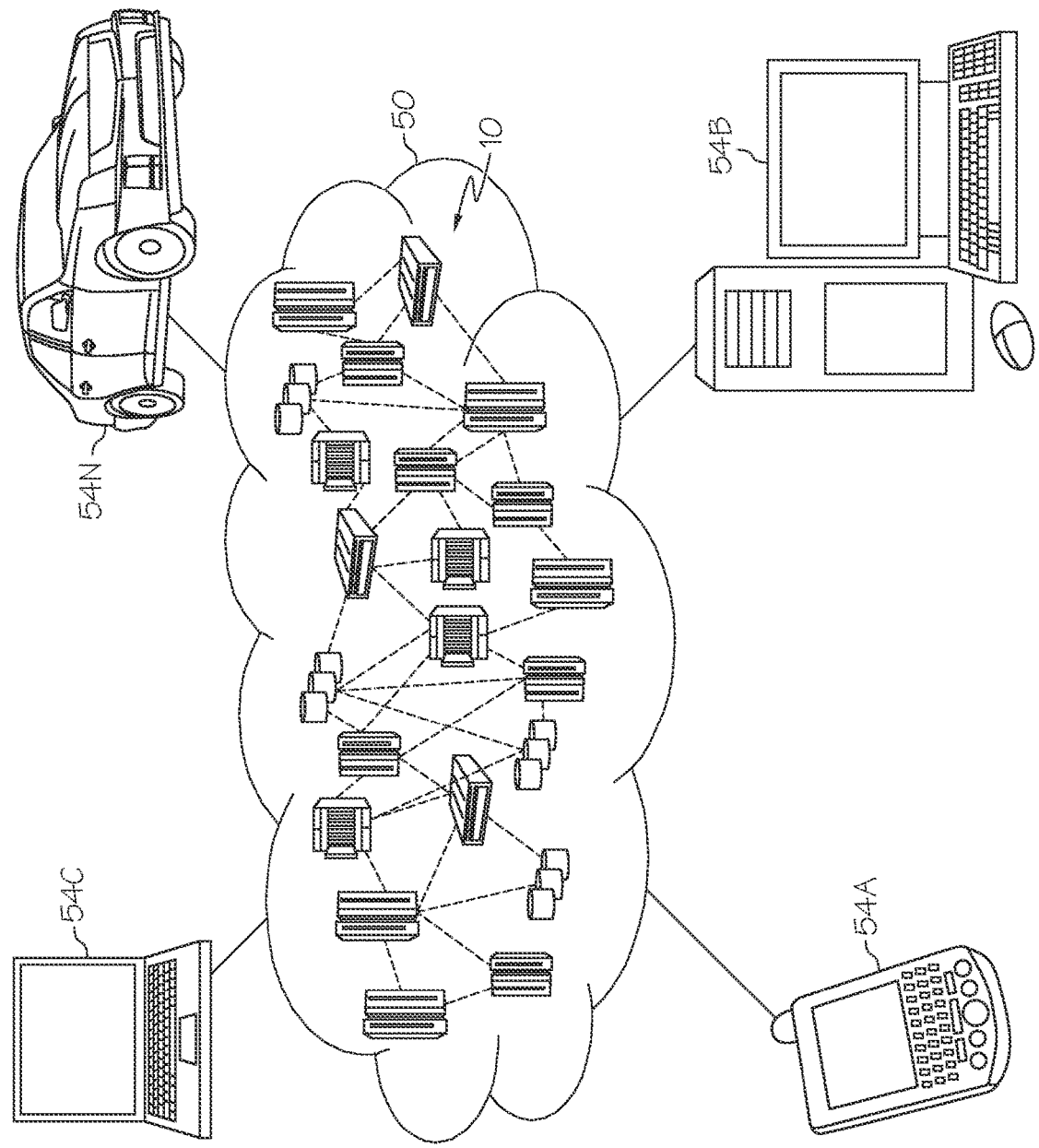
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
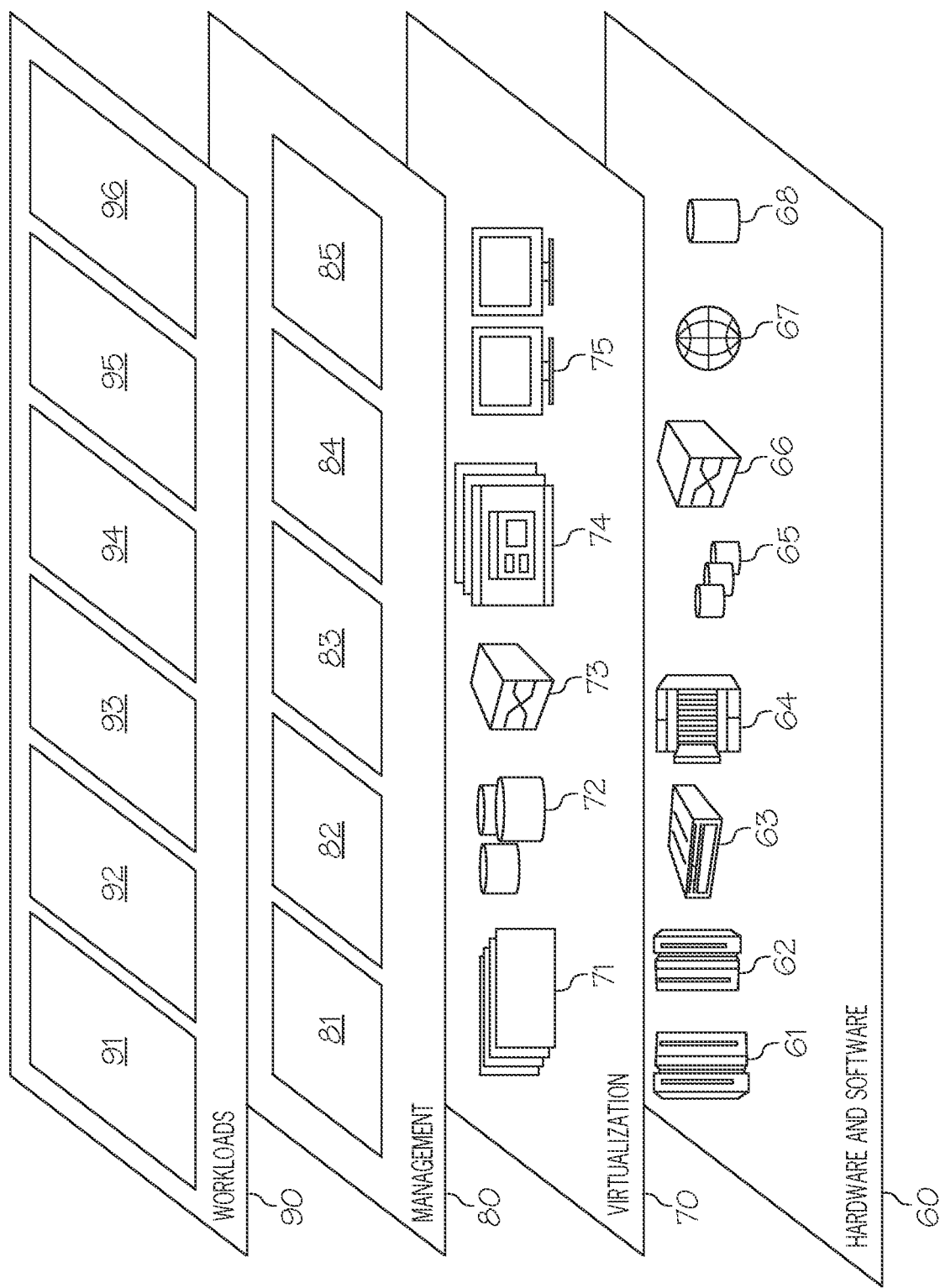
FIG. 8 depicts abstraction model layers of a cloud computer environment according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and parameter data sharing processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer program product for parameter data sharing, the computer program product comprising:
   one or more computer readable storage media, and program instructions collectively stored on the one or more computer readable storage media, the program instructions comprising:
      program instructions to receive, by a first machine, a first set of global parameters from a global parameter server, wherein the first set of global parameters are weights of one or more operands used in a first algorithm that models a first entity type, wherein each of the weights used in the first algorithm has a same value as other weights used in the first algorithm, and wherein the same value of the weights used in the first algorithm is used for parameter weights in a second algorithm that is based on the first algorithm to model a second entity type;
      program instructions to execute, by multiple learner processors in the first machine, the first algorithm using the first set of global parameters and a first mini batch of data known to describe the first entity type;
      program instructions to generate, by the first machine, a first consolidated set of gradients that describes a direction for the first set of global parameters in order to improve an accuracy of the first algorithm in modeling the first entity type when using the first set of global parameters and the first mini-batch of data known to describe the first entity type;
      program instructions to transmit, from the first machine, the first consolidated set of gradients to the global parameter server;
      program instructions to receive, by the first machine, a second set of global parameters from the global parameter server, wherein the second set of global parameters is a modification of the first set of global parameters based on the first consolidated set of gradients, and wherein the second set of global parameters is used in the second algorithm to model the second entity type; and
      program instructions to execute, by the first machine, the second algorithm using the second set of global parameters to describe the second entity type.

2. The computer program product of claim 1, wherein the multiple learner processors are hardware processors, and wherein the computer program product further comprises:
   program instructions to generate each gradient from the first consolidated set of gradients by a different learner processor;
   program instructions to write, by each of the multiple learner processors, each gradient generated by each of the multiple learner processors to a memory; and
   program instructions to consolidate gradients generated by all of the multiple learner processors in order to create the first consolidated set of gradients.

3. The computer program product of claim 1, further comprising:
   program instructions to read the first set of global parameters and the second set of global parameters from a shared memory.

4. The computer program product of claim 1, further comprising:
   program instructions to store the first set of global parameters currently in use when executing the first algorithm in a first memory; and
   program instructions to store the second set of global parameters being downloaded from the global parameter server for future use, in a second memory, wherein the global parameters in the second set of global parameters from the global parameter server are speculatively generated global parameters, generated by the global parameter server, to be used in a next iteration of the first algorithm.

5. The computer program product of claim 1, wherein a first version number is assigned to the first set of global parameters, wherein a second version number is assigned to the second set of global parameters, and wherein the computer program product further comprises:
 program instructions to identify all parameters from the first set of global parameters according to the first version number;
 program instructions to determine that said all parameters from the first set of global parameters have been used to generate the first consolidated set of gradients based on said identifying all parameters from the first set of global parameters according to the first version number; and
 in response to determining that all parameters from the first global parameters have been used to generate the first consolidated set of gradients, program instructions to utilize the second set of global parameters, as identified by the second version number, to generate a second consolidated set of gradients that further describes the direction for the first set of global parameters.

6. The computer program product of claim 1, wherein the first consolidated set of gradients is an average of multiple gradients generated.

7. The computer program product of claim 1, wherein the first set of global parameters is a vector, wherein the multiple learner processors are graph processing units (GPUs), and wherein the computer program product further comprises:
 program instructions to generate the first consolidated set of gradients from the first set of global parameters and the first mini batch of data known to describe the first entity type.

8. The computer program product of claim 1, further comprising:
 program instructions to determine that the one or more operands, used in the algorithm that models the entity type, comprise a first operand and a second operand;
 program instructions to determine that results of any operations that use a multiplication operator is inconsequential to modeling the first entity type;
 program instructions to determine that the first operand is multiplied by the second operand in the first algorithm; and
 in response to determining that the first operand is multiplied by the second operand, program instructions to apply a weight that approaches zero to a product of the first operand and the second operand, wherein applying the weight that approaches zero to the first operand removes the product of the first operand and the second operand from the algorithm before executing the first algorithm.

9. The computer program product of claim 1, wherein the program instructions are provided as a service in a cloud environment.

10. The computer program product of claim 1, wherein the computer program product further comprises:
 program instructions to receive the first set of global parameters from the global parameter server;
 program instructions to execute the first algorithm using the first set of global parameters and a second mini batch of data known to describe the first entity type;
 program instructions to generate a second consolidated set of gradients that describe a direction for the first set of global parameters in order to improve the accuracy of the first algorithm in modeling the first entity type when using the first set of global parameters;
 program instructions to transmit the second consolidated set of gradients to the global parameter server; and
 program instructions to receive a third set of global parameters from the global parameter server, wherein the third set of global parameters is a modification of the first set of global parameters based on the first consolidated set of gradients and the second consolidated set of gradients.

11. A computer system, the computer system comprising:
 one or more processors, one or more computer-readable memories, one or more computer-readable tangible storage medium, and program instructions stored on the at least one of the one or more tangible storage medium for execution by at least one of the one or more processors via at least one of the one or more memories, the stored program instructions comprising:
 program instructions to receive, by a first machine, a first set of global parameters from a global parameter server, wherein the first set of global parameters are weights of one or more operands used in a first algorithm that models a first entity type, wherein each of the weights used in the first algorithm has a same value as other weights used in the first algorithm, and wherein the same value of the weights used in the first algorithm is used for parameter weights in a second algorithm that is based on the first algorithm to model a second entity type;
 program instructions to execute, by multiple learner processors in the first machine, the first algorithm using the first set of global parameters and a first mini batch of data known to describe the first entity type;
 program instructions to generate, by the first machine, a first consolidated set of gradients that describes a direction for the first set of global parameters in order to improve an accuracy of the first algorithm in modeling the first entity type when using the first set of global parameters and the first mini-batch of data known to describe the first entity type;
 program instructions to transmit, from the first machine, the first consolidated set of gradients to the global parameter server;
 program instructions to receive, by the first machine, a second set of global parameters from the global parameter server, wherein the second set of global parameters is a modification of the first set of global parameters based on the first consolidated set of gradients, and wherein the second set of global parameters is used in the second algorithm to model the second entity type; and
 program instructions to execute, by the first machine, the second algorithm using the second set of global parameters to describe the second entity type.

12. The computer system of claim 11, wherein the multiple learner processors are hardware processors, and wherein the stored program instructions further comprise:
 program instructions to generate each gradient from the first consolidated set of gradients by a different learner processor;

program instructions to write, by each of the multiple learner processors, each gradient generated by each of the multiple learner processors to a memory; and program instructions to consolidate gradients generated by all of the multiple learner processors in order to create the first consolidated set of gradients.

13. The computer system of claim 11, the stored program instructions further comprising:

program instructions to read the first set of global parameters and the second set of global parameters from a shared memory.

14. The computer system of claim 11, the stored program instructions further comprising:

program instructions to store the first set of global parameters currently in use when executing the first algorithm in a first memory; and program instructions to store the second set of global parameters being downloaded from the global parameter server for future use, in a second memory, wherein the global parameters in the second set of global parameters from the global parameter server are speculatively generated global parameters, generated by the global parameter server, to be used in a next iteration of the first algorithm.

15. The computer system of claim 11, wherein a first version number is assigned to the first set of global parameters, wherein a second version number is assigned to the second set of global parameters, and wherein the stored program instructions further comprise:

program instructions to identify all parameters from the first set of global parameters according to the first version number;

program instructions to determine that said all parameters from the first set of global parameters have been used to generate the first consolidated set of gradients based on said identifying all parameters from the first set of global parameters according to the first version number; and in response to determining that all parameters from the first global parameters have been used to generate the first consolidated set of gradients, program instructions to utilize the second set of global parameters, as identified by the second version number, to generate a second consolidated set of gradients that further describes the direction for the first set of global parameters.

16. The computer system of claim 11, wherein the first consolidated set of gradients is an average of multiple gradients generated.

17. The computer system of claim 11, wherein the first set of global parameters is a vector, wherein the multiple learner processors are graph processing units (GPUs), and wherein the stored program instructions further comprise:

program instructions to generate the first consolidated set of gradients from the first set of global parameters and the first mini batch of data known to describe the first entity type.

18. The computer system of claim 11, the stored program instructions further comprising:

program instructions to determine that the one or more operands, used in the algorithm that models the entity type, comprise a first operand and a second operand;

program instructions to determine that results of any operations that use a multiplication operator is inconsequential to modeling the first entity type;

program instructions to determine that the first operand is multiplied by the second operand in the first algorithm; and in response to determining that the first operand is multiplied by the second operand, program instructions to apply a weight that approaches zero to a product of the first operand and the second operand, wherein applying the weight that approaches zero to the first operand removes the product of the first operand and the second operand from the algorithm before executing the first algorithm.

19. The computer system of claim 11, wherein the program instructions are provided as a service in a cloud environment.

20. The computer system of claim 11, the stored program instructions further comprising:

program instructions to receive the first set of global parameters from the global parameter server;

program instructions to execute the first algorithm using the first set of global parameters and a second mini batch of data known to describe the first entity type;

program instructions to generate a second consolidated set of gradients that describe a direction for the first set of global parameters in order to improve the accuracy of the first algorithm in modeling the first entity type when using the first set of global parameters;

program instructions to transmit the second consolidated set of gradients to the global parameter server; and program instructions to receive a third set of global parameters from the global parameter server, wherein the third set of global parameters is a modification of the first set of global parameters based on the first consolidated set of gradients and the second consolidated set of gradients.

* * * * *